US008954808B1

(12) United States Patent
McLean et al.

(10) Patent No.: US 8,954,808 B1
(45) Date of Patent: *Feb. 10, 2015

(54) SYSTEMS AND METHODS FOR PERFORMING INPUT/OUTPUT PATH FAILOVERS

(75) Inventors: Malcolm Stephan McLean, Andover, MA (US); Venkata Sreenivasarao Nagineni, Mountain View, CA (US); David Thompson, Sebastopol, CA (US)

(73) Assignee: Symantec Corporation, Mountain View, CA (US)

( * ) Notice: Subject to any disclaimer, the term of this patent is extended or adjusted under 35 U.S.C. 154(b) by 409 days.

This patent is subject to a terminal disclaimer.

(21) Appl. No.: 12/956,434

(22) Filed: Nov. 30, 2010

(51) Int. Cl.
G06F 11/00 (2006.01)

(52) U.S. Cl.
USPC .................. 714/43; 714/48; 714/5.1

(58) Field of Classification Search
USPC ...................... 714/5.1, 5.11, 43, 48
See application file for complete search history.

(56) References Cited

U.S. PATENT DOCUMENTS

| 4,970,640 | A  | * | 11/1990 | Beardsley et al. | 710/104 |
| 5,574,863 | A  | * | 11/1996 | Nelson et al. | 710/100 |
| 6,256,748 | B1 | * | 7/2001  | Pinson | 714/6.23 |
| 6,304,942 | B1 | * | 10/2001 | DeKoning | 711/114 |
| 6,578,158 | B1 | * | 6/2003  | Deitz et al. | 714/11 |
| 7,039,828 | B1 | * | 5/2006  | Scott | 714/4.11 |
| 7,194,662 | B2 | * | 3/2007  | Do et al. | 714/43 |
| 7,272,674 | B1 | * | 9/2007  | Nandi et al. | 710/38 |
| 7,318,138 | B1 | * | 1/2008  | Usgaonkar | 711/163 |
| 7,539,838 | B1 | * | 5/2009  | Todd et al. | 711/170 |
| 7,783,779 | B1 | * | 8/2010  | Scales et al. | 709/240 |
| 7,818,408 | B1 | * | 10/2010 | Ignatuk et al. | 709/221 |
| 7,992,039 | B2 | * | 8/2011  | Belyakov et al. | 714/16 |
| 8,060,775 | B1 | * | 11/2011 | Sharma et al. | 714/5.11 |
| 8,074,105 | B2 | * | 12/2011 | Kalwitz et al. | 714/6.22 |
| 8,171,098 | B1 | * | 5/2012  | Zelikov et al. | 709/213 |
| 8,204,980 | B1 | * | 6/2012  | Sandstrom et al. | 709/224 |
| 8,321,722 | B2 | * | 11/2012 | Tanaka et al. | 714/6.3 |
| 8,381,027 | B1 | * | 2/2013  | Liu et al. | 714/13 |
| 8,443,119 | B1 | * | 5/2013  | Limaye et al. | 710/31 |

(Continued)

OTHER PUBLICATIONS

Rishi Manocha, Veritas Storage Foundation 5.0 Dynamic Multi-pathing: Optimizing Availability and Performance in Multi-Vendor Environments; http://www.symantec.com/connect/articles/veritas-storage-foundation-50-dynamic-multi-pathing-optimizing-availability-and-performance; Taken from site on Sep. 13, 2010.

(Continued)

*Primary Examiner* — Loan L. T. Truong
(74) *Attorney, Agent, or Firm* — ALG Intellectual Property, LLC

(57) ABSTRACT

A computer-implemented method for performing input/output path failovers may include identifying a computing system with a plurality of input/output paths to a storage array. The computer-implemented method may additionally include detecting a failure of a first input/output path within the plurality of input/output paths. The computer-implemented method may also include receiving a communication from the storage array indicating that a storage processor within the first input/output path is unavailable. The computer-implemented method may further include selecting at least one alternate input/output path within the plurality of input/output paths that does not include the storage processor. The computer-implemented method may additionally include reconfiguring the computing system to access the storage array via the alternate input/output path. Various other methods, systems, and computer-readable media are also disclosed.

20 Claims, 6 Drawing Sheets

(56) References Cited

U.S. PATENT DOCUMENTS

| | | | |
|---|---|---|---|
| 8,626,967 B1* | 1/2014 | Naik et al. | 710/38 |
| 2002/0133735 A1* | 9/2002 | McKean et al. | 714/5 |
| 2004/0107300 A1* | 6/2004 | Padmanabhan et al. | 710/1 |
| 2004/0153711 A1* | 8/2004 | Brunelle et al. | 714/4 |
| 2005/0097394 A1* | 5/2005 | Wang et al. | 714/11 |
| 2006/0050630 A1* | 3/2006 | Kobayashi et al. | 370/216 |
| 2006/0242156 A1* | 10/2006 | Bish et al. | 707/10 |
| 2006/0277328 A1* | 12/2006 | Cherian et al. | 710/36 |
| 2007/0067417 A1* | 3/2007 | Burroughs et al. | 709/218 |
| 2008/0126615 A1* | 5/2008 | Sinclair et al. | 710/38 |
| 2008/0126631 A1* | 5/2008 | Bailey et al. | 710/74 |
| 2008/0133852 A1* | 6/2008 | Grier et al. | 711/154 |
| 2008/0155307 A1* | 6/2008 | French et al. | 714/3 |
| 2008/0215827 A1* | 9/2008 | Pepper | 711/154 |
| 2008/0307252 A1* | 12/2008 | Bartley et al. | 714/6 |
| 2010/0235549 A1* | 9/2010 | Kabakura | 710/40 |
| 2010/0306575 A1* | 12/2010 | Futawatari | 714/5 |
| 2011/0047440 A1* | 2/2011 | Blackmon et al. | 714/764 |
| 2011/0179188 A1* | 7/2011 | Nakagawa et al. | 709/240 |
| 2011/0320640 A1* | 12/2011 | Butler et al. | 710/8 |
| 2012/0017061 A1* | 1/2012 | Kawaguchi | 711/165 |
| 2012/0124414 A1* | 5/2012 | Dallas et al. | 714/6.2 |
| 2012/0137085 A1* | 5/2012 | Kaneta et al. | 711/154 |

OTHER PUBLICATIONS

Redhat, Device Mapper Mulitpathing; http://www.redhat.com/docs/en-US/Red_Hat_Enterprise_Linux/6-Beta/html/DM_Multipath/MPIO_Overview.html; Taken from site on Sep. 13, 2010.

Novell, Novell Forums; http://forums.novell.com/novell-product-support-forums/open-enterprise-server/oes-netware/oes-nw-storage-media/143453-msa500-multipath-setup.html; Taken from site on Sep. 1, 2010.

VMware Communities, Multipathing policy; http://communities.vmware.com/message/370754; Taken from site on Sep. 13, 2010.

HP, Device Mapper Multipath Enablement Kit for HP Storage Works Disk Arrays v4.2.1 release notes; http://bizsupport2.austin.hp.com/bc/docs/support/SupportManual/c01705624/c01705624.pdf; Mar. 2009.

Novell, Multipath Management Tools; http://www.novell.com/documentation/sles10/stor_evms/?page=/documentation/sles10/stor_evms/data/mpiotools.html; Taken from site on Sep. 13, 2010.

Novell, Multipath Management Tools; http://www.novell.com/documentation/sles11/stor_admin/?page=/documentation/sles11/stor_admin/data/mpiotools.html; Taken from site on Sep. 13, 2010.

VMware, Configuring IBM FAStT Storage Processor to Use Multipathing with HBA and Storage Port Failover Along with Clustering; http://kb.vmware.com/selfservice/microsites/search.do?language=en_US&cmd=displayKC&externalId=1303; Taken from site on Sep. 13, 2010.

Michael Tesfamariam et al., Configuring Linux to Enable Multipath I/O; http://www.dell.com/downloads/global/power/ps3q06-20060189-Michael.pdf; Aug. 2006.

Softpanorama, Linux Multipath; http://www.softpanorama.org/Commercial_linuxes/Devices/multipath.shtml; Taken from site on Sep. 13, 2010.

* cited by examiner

SYSTEMS AND METHODS FOR PERFORMING INPUT/OUTPUT PATH FAILOVERS

BACKGROUND

Organizations increasingly depend on digitally-stored data in the course of business. For this reason, many organizations may employ a storage array to store their data. Storage arrays may provide improved availability and maintainability through redundant components.

In a common configuration, a host system may connect to a storage array via one of multiple available input/output paths. An input/output path may represent, e.g., a network traversal combined with the use of a particular storage processor within the storage array. If one path fails between the host system and the storage array, the host system may use another available input/output path.

Unfortunately, traditional failover processes may consume a significant amount of time and computing resources. For example, some traditional technologies may check the remaining input/output paths one at a time. However, depending on the timing of these checks, a driver may incorrectly determine that no alternate paths are available, potentially leading to time consuming error processing and even service outages. These problems may be exacerbated in the context of a large server cluster connected to the storage array. Furthermore, input/output service time may increase during a failover. When a separate failover is performed for each logical unit within a storage array, this effect may be multiplied. Accordingly, the instant disclosure addresses a need for improved and additional systems and methods for performing input/output path failovers.

SUMMARY

As will be described in greater detail below, the instant disclosure generally relates to systems and methods for performing input/output path failovers. Systems and methods described herein may determine that a storage processor is unavailable and then eliminate all input/output paths that include the storage processor as potential alternative paths. For example, a method may include 1) identifying a computing system with a plurality of input/output paths to a storage array, 2) detecting a failure of a first input/output path within the plurality of input/output paths, 3) receiving a communication from the storage array indicating that a storage processor within the first input/output path is unavailable, 4) selecting at least one alternate input/output path within the plurality of input/output paths that does not include the storage processor, and then 5) reconfiguring the computing system to access the storage array via the alternate input/output path.

The failure of the input/output path may occur in a variety of contexts. For example, the failure of the path may be a result of an operator-induced failure of the storage processor (e.g., the failure may occur during a firmware update of the storage processor). Additionally or alternatively, the failure of the path may result from an error originating from the storage processor.

The systems described herein may select the alternate input/output path by excluding every input/output path in the plurality of input/output paths that includes the storage processor from a failover attempt. In some examples, the computing system may include a cluster of nodes. In these examples, the systems described herein may select a node-specific input/output path for at least one node in the cluster of nodes.

A multipath driver may enable the computing system to access the storage array via the various input/output paths. Consequently, reconfiguring the computing system to access the storage array via the alternate input/output path may include configuring a multipath driver running on the computing system to use the alternate input/output path for attempts to access the storage array. Additionally or alternatively, if the computing system includes a cluster of nodes, the systems described herein may reconfigure the computing system by reconfiguring at least one node in the cluster of nodes to access the storage array via the alternate input/output path.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
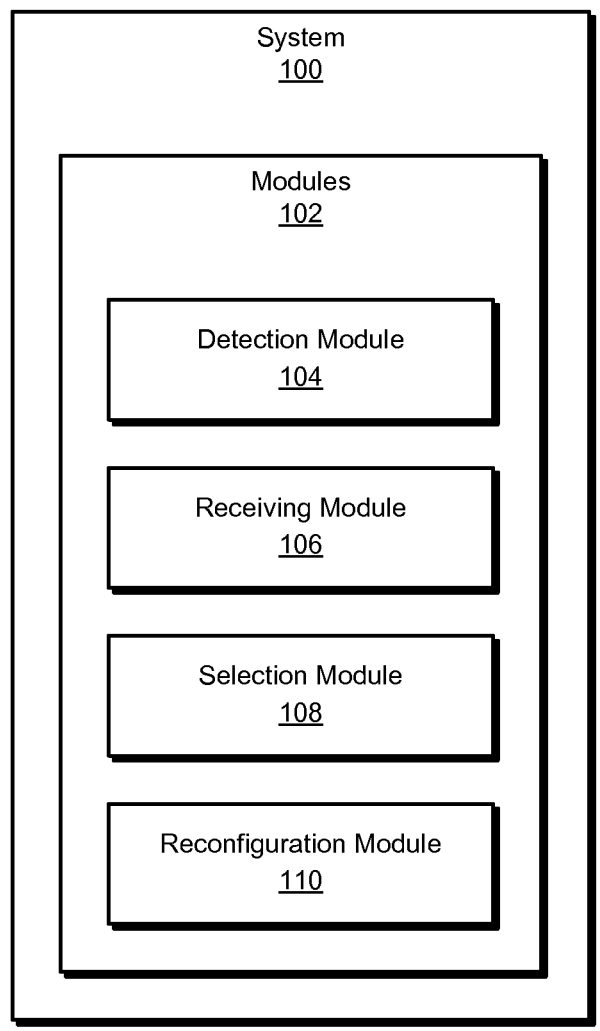
FIG. 1 is a block diagram of an exemplary system for performing input/output path failovers.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for performing input/output path failovers. Systems and methods described herein may determine that a storage processor is unavailable and then eliminate all input/output paths that include the storage processor as potential alternative paths.

By eliminating input/output paths from selection based on information from the storage processor, these systems and methods may more efficiently failover to an available input/output path, potentially improving input/output service times and potentially avoiding error processing and/or service outages associated with an inability to efficiently find an available input/output path.

Figure 2:
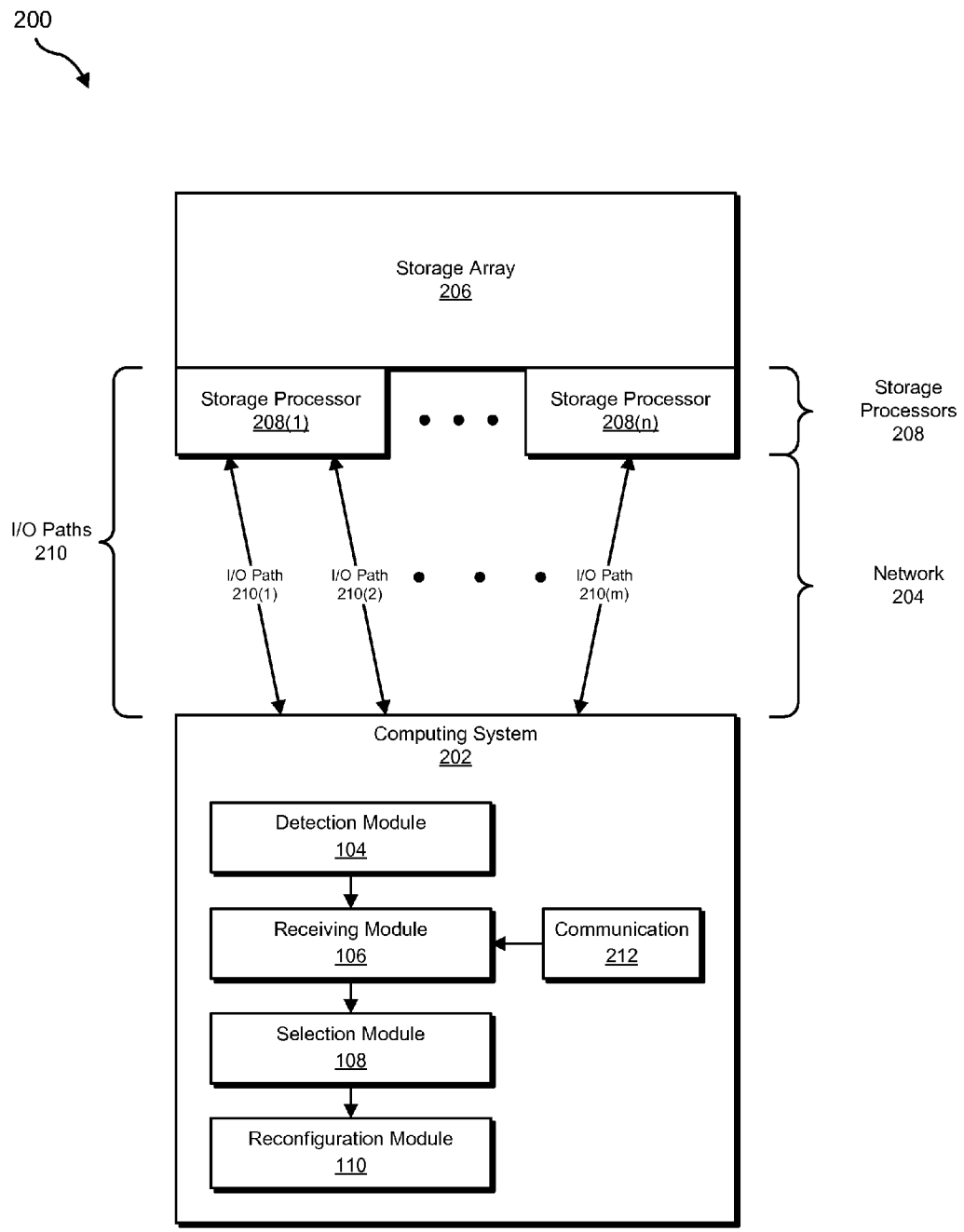
FIG. 2 is another block diagram of an exemplary system for performing input/output path failovers.
Figure 3:
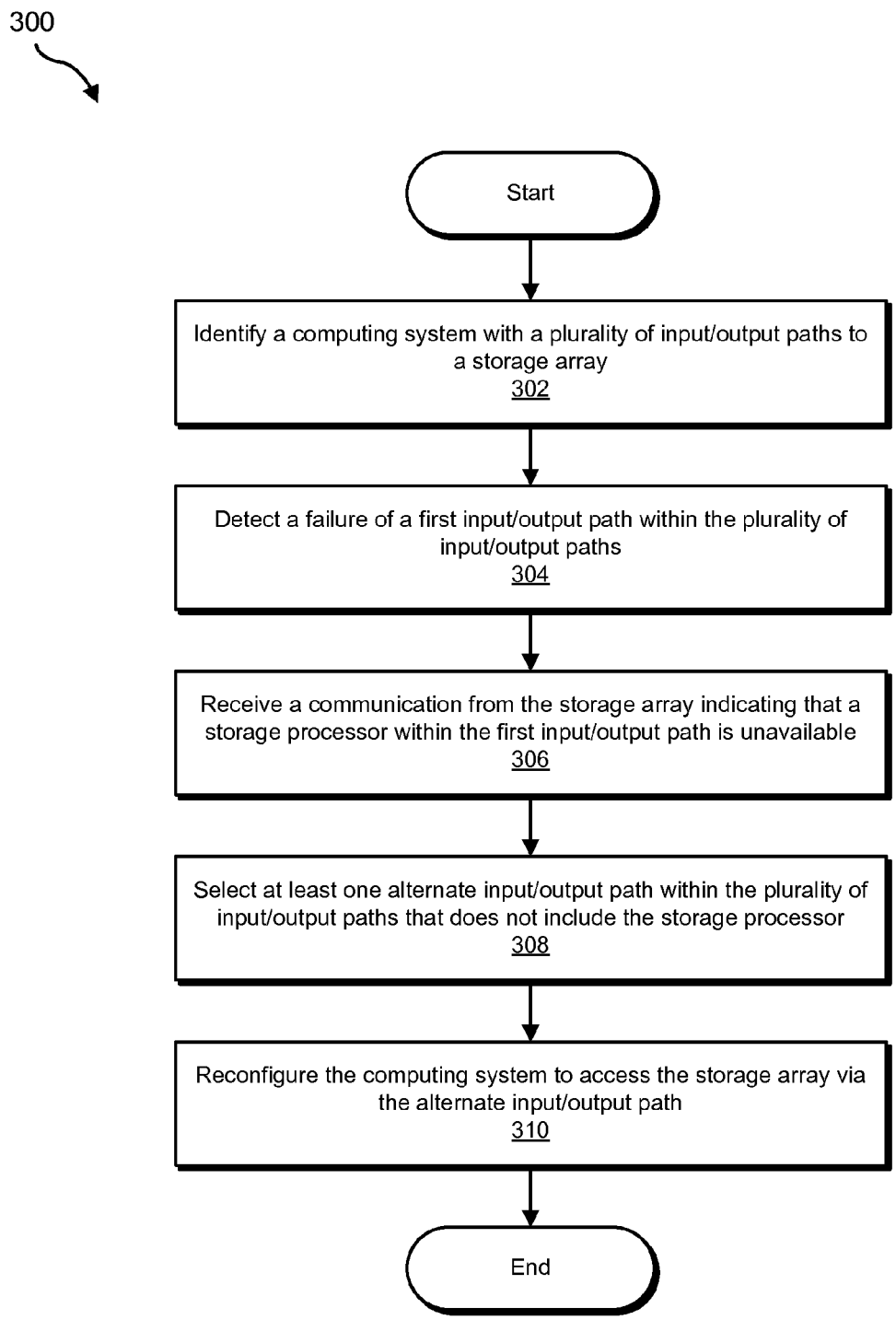
FIG. 3 is a flow diagram of an exemplary method for performing input/output path failovers.
Figure 4:
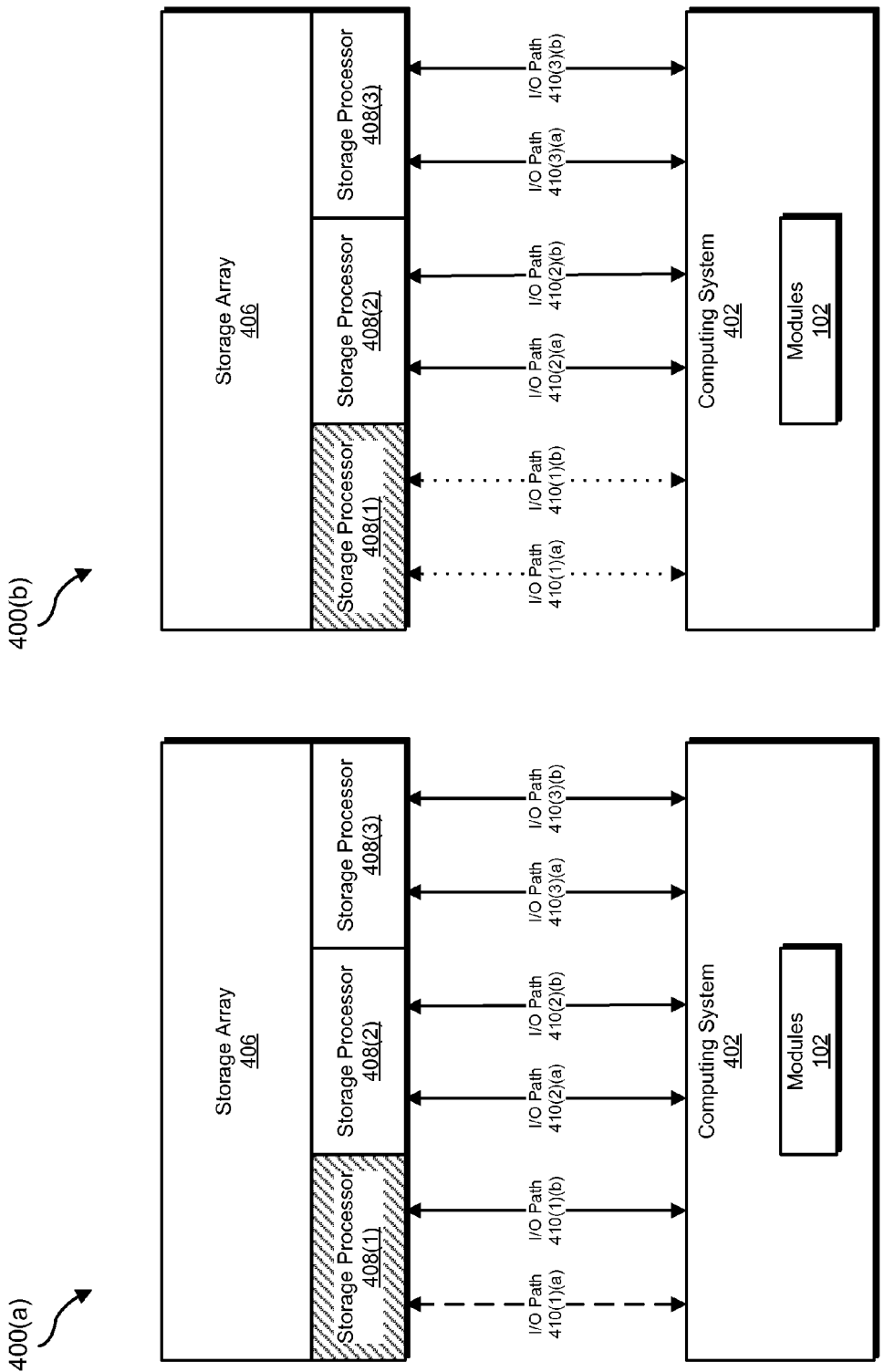
FIG. 4 is a block diagram of an exemplary system for performing input/output path failovers.

The following will provide, with reference to FIGS. 1, 2, and 4, detailed descriptions of exemplary systems for performing input/output path failovers. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing input/output path failovers. As illustrated in this figure, exemplary system 100 may include one or more modules 102 for performing one or more tasks. For example, and as will be explained in greater detail below, exemplary system 100 may include a detection module 104 programmed to identify a computing system with a plurality of input/output paths to a storage array and to detect a failure of a first input/output path within the plurality of input/output paths. Exemplary system 100 may also include a receiving module 106 programmed to receive a communication from the storage array indicating that a storage processor within the first input/output path is unavailable.

In addition, and as will be described in greater detail below, exemplary system 100 may include a selection module 108 programmed to select at least one alternate input/output path within the plurality of input/output paths that does not include the storage processor. Exemplary system 100 may also include a reconfiguration module 110 programmed to reconfigure the computing system to access the storage array via the alternate input/output path. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing system 202 and/or storage array 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be deployed in a variety of ways. For example, all or a portion of exemplary system 100 may represent portions of exemplary system 200 illustrated in FIG. 2. As shown in FIG. 2, system 200 may include a computing system 202 in communication with a storage array 206 via a network 204. Computing system 202 may be configured to use storage array 206 for storing data. In one embodiment, and as will be described in greater detail below, modules computing system 202 to may include detection module 104, receiving module 106, selection module 108, and reconfiguration module 110.

Detection module 104 may be programmed to identify input/output paths 210 between computing system 202 and storage array 206. Detection module 104 may also be programmed to detect a failure of an input/output path within I/O paths 210 (e.g., I/O path 210(1)). Receiving module 106 may be programmed to receive a communication 212 from storage array 206 indicating that a storage processor 208(1) within I/O path 210(1) is unavailable. Selection module 108 may be programmed to select at least one alternate input/output path within I/O paths 210 that does not include storage processor 208(1) (e.g., an I/O path 210(m)).

Computing system 202 generally represents any type or form of computing device capable of reading computer-executable instructions. Examples of computing system 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device. In some examples, computing system 202 may represent a cluster of computing devices.

Storage array 206 generally represents any type or form of computing system that is capable of storing data. Storage array 206 may provide access to storage services via two or more storage processors, such as storage processors 208. Examples of storage array 206 include, without limitation, disk arrays and/or any other type of storage device array. For example, storage array 206 may include a plurality of disks accessible via a plurality of storage processors. Storage processors 208 generally represent any type or form of storage processors and/or storage controllers used for managing I/O operations for a storage array.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing system 202 and storage array 206 (e.g., across one or more of I/O paths 210).

FIG. 3 is a flow diagram of an exemplary computer-implemented method 300 for performing input/output path failovers. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 one or more of the systems described herein may identify a computing system with a plurality of input/output paths to a storage array. For example, at step 302 detection module 104 may, as part of computing system 202, identify computing system 202 with I/O paths 210 to storage array 206.

As used herein, the phrase "input/output path" may refer to any element or series of elements in a data transfer infrastructure, such as cables, transmitters, switches, controllers, storage processors, and/or software modules. For example, I/O path 210(1) of FIG. 2 may include elements of network 204 as well as storage processor 208(1). In some examples, multiple input/output paths may include the same storage processor. Additionally or alternatively, multiple input/output paths may include overlapping portions of a network infrastructure. Accordingly, two distinct input/output paths may include overlapping elements within a data transfer infrastructure.

Detection module 104 may perform step 302 in a variety of contexts. For example, detection module 104 may run on the computing system. In this example, detection module 104 may identify the computing system simply by executing within the computing system. Additionally or alternatively, as mentioned earlier, the computing system may include a cluster of nodes. In this example, detection module 104 may identify the computing system by reading a configuration file and/or receiving a message that identifies the cluster of nodes and/or each node in the cluster of nodes.

FIG. 4 is a block diagram of an exemplary system for performing input/output failovers. As illustrated in FIG. 4, a computing system 402 may connect to a storage array 406 via I/O paths 410(1)(a), 410(1)(b), 410(2)(a), 410(2)(b), 410(3)(a), and 410(3)(b). Storage array 406 may include storage processors 408(1)-(3). FIG. 4 illustrates this system in a state 400(a) and a state 400(b). Using FIG. 4 as an example for step 302, detection module 104 may identify computing system 402 with I/O paths 410 to storage array 406.

Returning to FIG. 3, at step 304 one or more of the systems described herein may detect a failure of a first input/output path within the plurality of input/output paths. For example, at step 304 detection module 104 may, as part of computing system 202, detect a failure of I/O path 210(1). Using FIG. 4 as an example, at step 304 detection module 104 may, as part of computing system 402, detect a failure of I/O path 410(1)(a).

As used herein, the term "failure" as relating to an input/output path may refer to the input/output path becoming unavailable and/or unsuited for input/output communications for any reason, including, without limitation, hardware faults, software errors, and/or administrative commands to shut down the input/output path and/or a component of the input/output path.

Detection module 104 may perform step 304 in a variety of contexts. In some examples, the failure of the first input/output path may have resulted from an operator-induced failure of a storage processor within the first input/output path. For example, an administrator may have turned off the storage processor, removed the storage processor, and/or disabled the storage processor. In one example, the storage processor may be temporarily disabled due to a firmware update in process (e.g., initiated by an administrator, by the storage array, etc.). In this example, the firmware update may include any update, upgrade, change, reset, and/or reconfiguration of the storage processor. In the above contexts, detection module 104 may detect the failure of the first input/output path when an attempted input/output operation via the first input/output path fails (e.g., due to the unavailable storage processor).

In some contexts, the failure of the input/output path may have resulted from an internal failure originating from a storage processor within the first input/output path. For example, the storage processor may have malfunctioned due to a hardware problem, a firmware error, etc. In these contexts, detection module 104 may detect the failure of the first input/output path when an attempted input/output operation via the first input/output path fails (e.g., due to the failed storage processor).

Generally, the failure of the first input/output path may relate to any failure produced by and/or resulting from a storage processor failure in the first input/output path. As used herein, the term "failure" as relating to a storage processor may refer to any failure, error, and/or unavailability relating to the storage processor.

Returning to FIG. 3, at step 306 one or more of the systems described herein may receive a communication from the storage array indicating that a storage processor within the first input/output path is unavailable. For example, at step 306 receiving module 106 may, as part of computing system 202, receiving communication 212 from storage array 206 indicating that storage processor 208(1) within I/O path 210(1) is unavailable. Using FIG. 4 as an example, at step 306 receiving module 106 may, as part of computing system 402, receive a communication from storage array 406 indicating that storage processor 408(1) within I/O path 410(1)(a) is unavailable.

Receiving module 106 may receive the communication in a variety of contexts. For example, the storage array may be configured to transmit the communication upon a failure of the storage processor. Additionally or alternatively, the storage array may be configured to transmit the communication upon a failed input/output operation directed to the storage processor (e.g., as part of an error message). In some examples, the storage array may be configured to transmit the communication in response to a query about the status of the storage processor.

Returning to FIG. 3, at step 308 one or more of the systems described herein may select at least one alternate input/output path within the plurality of input/output paths that does not include the storage processor. For example, at step 308 selection module 108 may, as part of computing system 202, select I/O path 210(m).

Selection module 108 may perform step 308 in a variety of ways. For example, selection module 108 may select the alternate input/output path by excluding input/output paths that include the storage processor from a list of candidate alternate input/output paths for a failover attempt. Additionally or alternatively, selection module 108 may generate a list of candidate alternate input/output paths without using the storage processor as a possible element within any path. In some examples, selection module 108 may simply skip over any candidate alternate input/output path that includes the storage processor.

Using FIG. 4 as an example, after I/O path 410(1)(a) fails due to a failure of storage processor 408(1), selection module 108 may eliminate I/O path 410(1)(b) as a viable alternate path since I/O path 410(1)(b) also include storage processor 408(1). Accordingly, selection module 108 may select I/O path 410(2)(a), 410(2)(b), 410(3)(a), and/or 410(3)(b) as an alternate input/output path without trying I/O path 410(1)(b). By avoiding any attempted failover to I/O path 410(1)(b), the systems described herein may potentially reduce I/O service time and/or more efficiently complete the path failover process.

As mentioned earlier, in some examples the computing system may include a cluster of nodes. Returning to step 308, selection module 108 may, in these examples, select a node-specific input/output path for at least one node in the cluster of nodes. For example, selection module 108 may select a new input/output path for each node in the cluster that had used an input/output path including the storage processor. For example, after one node in the cluster experiences an input/output path failure due to a storage processor, an instance of selection module 108 may provide information about the failure from that node to an instance of selection module 108 on every other node in the cluster that might use an input/output path including the storage processor.

Returning to FIG. 3, at step 310 one or more of the systems described herein may reconfigure the computing system to access the storage array via the alternate input/output path. For example, at step 310 reconfiguration module 110 may, as part of computing system 202, reconfigure computing system 202 to access storage array 206 via I/O path 210(m). Using FIG. 4 as another example, at step 310 reconfiguration module 110 may, as part of computing system 402, reconfigure computing system 402 to access storage array 406 via I/O path 410(2)(a).

Reconfiguration module 110 may perform step 310 in any suitable manner. For example, reconfiguration module 110 may reconfigure the computing system by configuring a multipath driver running on the computing system to use the alternate input/output path for attempts to access the storage array. As used herein, the phrase "multipath driver" may refer to any driver and/or other component for device interface designed to support multipath input/output configuration environments. In some examples, reconfiguration module 110 may include at least a portion of the multipath driver.

In some examples, reconfiguration module 110 may reconfigure the computing system to use the alternate input/output path for each logical unit of the storage array that would have otherwise been accessed via an input/output path including the storage processor. As used herein, the phrase "logical unit" may refer to a device addressable by a data transfer protocol. For example, the storage array may be partitioned into multiple volumes and each volume may be represented by a logical unit number. If a logical volume manager separately identifies an input/output path for each logical unit number, reconfiguration module 110 may (e.g., as part of the logical volume manager) fail each input/output path that includes the storage processor over to the alternate input/output path. Accordingly, the systems described herein may avoid input/output operations to multiple logical units when a single storage processor may cause multiple input/output path failures.

As mentioned earlier, in some examples the computing system may include a cluster of nodes. Accordingly, reconfiguration module 110 may, in these examples, reconfigure at least one node in the cluster of nodes to access the storage array via the alternate input/output path. For example, reconfiguration module 110 may reconfigure a multipath driver on each node in the cluster of nodes that had used an input/output path including the storage processor.

Figure 5:
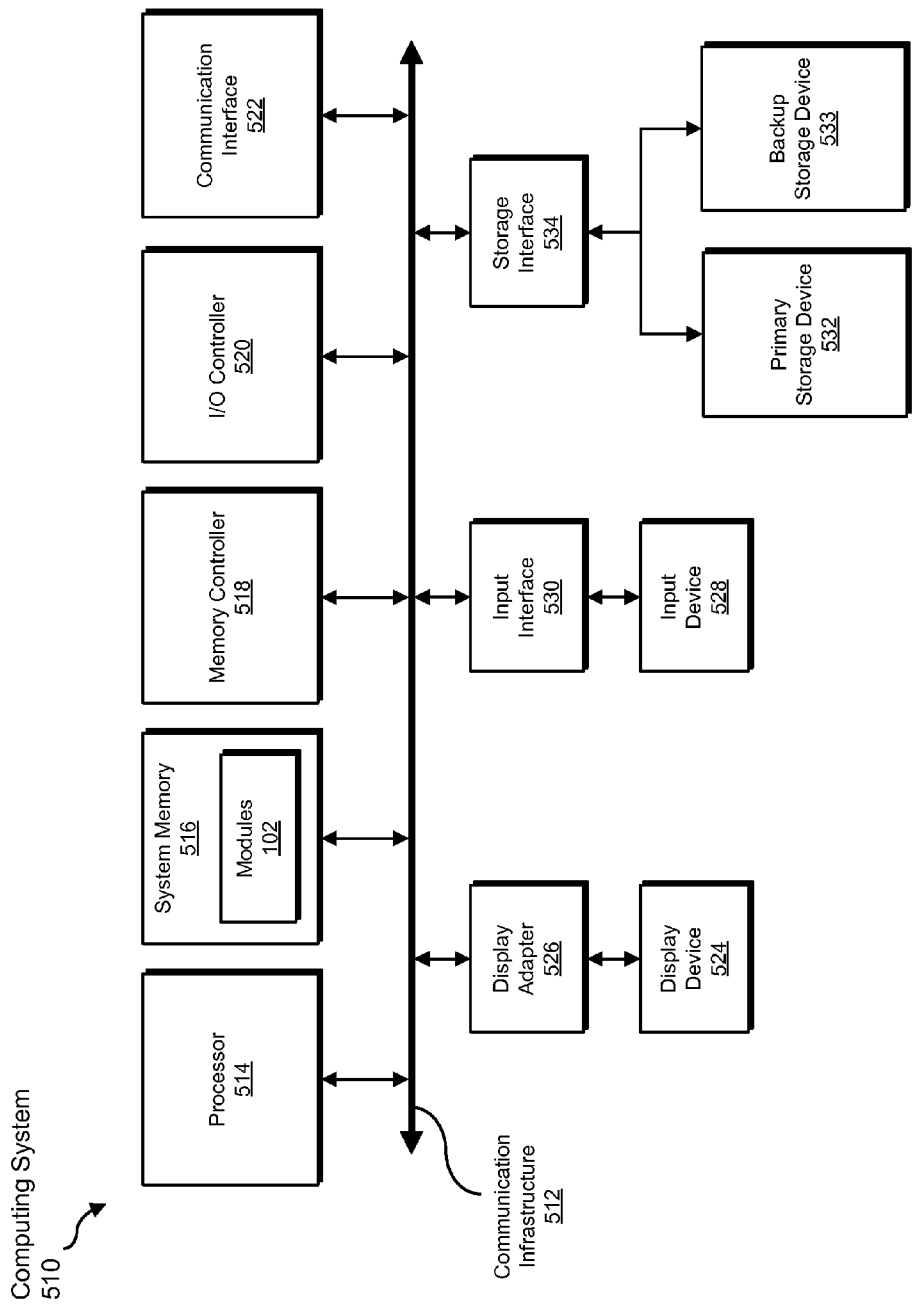
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein. For example, processor 514 may perform and/or be a means for performing, either alone or in combination with other elements, one or more of the identifying, detecting, receiving, selecting, excluding, reconfiguring, and/or configuring steps described herein. Processor 514 may also perform and/or be a means for performing any other steps, methods, or processes described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an input/output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512. In certain embodiments, memory controller 518 may perform and/or be a means for performing, either alone or in combination with other elements, one or more of the steps or features described and/or illustrated herein, such as identifying, detecting, receiving, selecting, excluding, reconfiguring, and/or configuring.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534. I/O controller 520 may be used, for example, to perform and/or be a means for performing, either alone or in combination with other elements, one or more of the identifying, detecting, receiving, selecting, excluding, reconfiguring, and/or configuring steps described herein. I/O controller 520 may also be used to perform and/or be a means for performing other steps and features set forth in the instant disclosure.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution. In certain embodiments, communication interface 522 may perform and/or be a means for performing, either alone or in combination with other elements, one or more of the identifying, detecting, receiving, selecting, excluding, reconfiguring, and/or configuring steps disclosed herein. Communication interface 522 may also be used to perform and/or be a means for performing other steps and features set forth in the instant disclosure.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device. In at least one embodiment, input device 528 may perform and/or be a means for performing, either alone or in combination with other elements, one or more of the identifying, detecting, receiving, selecting, excluding, reconfiguring, and/or configuring steps disclosed herein. Input device 528 may also be used to perform and/or be a means for performing other steps and features set forth in the instant disclosure.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

In certain embodiments, storage devices 532 and 533 may be used, for example, to perform and/or be a means for performing, either alone or in combination with other elements, one or more of the identifying, detecting, receiving, selecting, excluding, reconfiguring, and/or configuring steps disclosed herein. Storage devices 532 and 533 may also be used to perform and/or be a means for performing other steps and features set forth in the instant disclosure.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 510. All or a portion of the computer program stored on the computer-readable medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
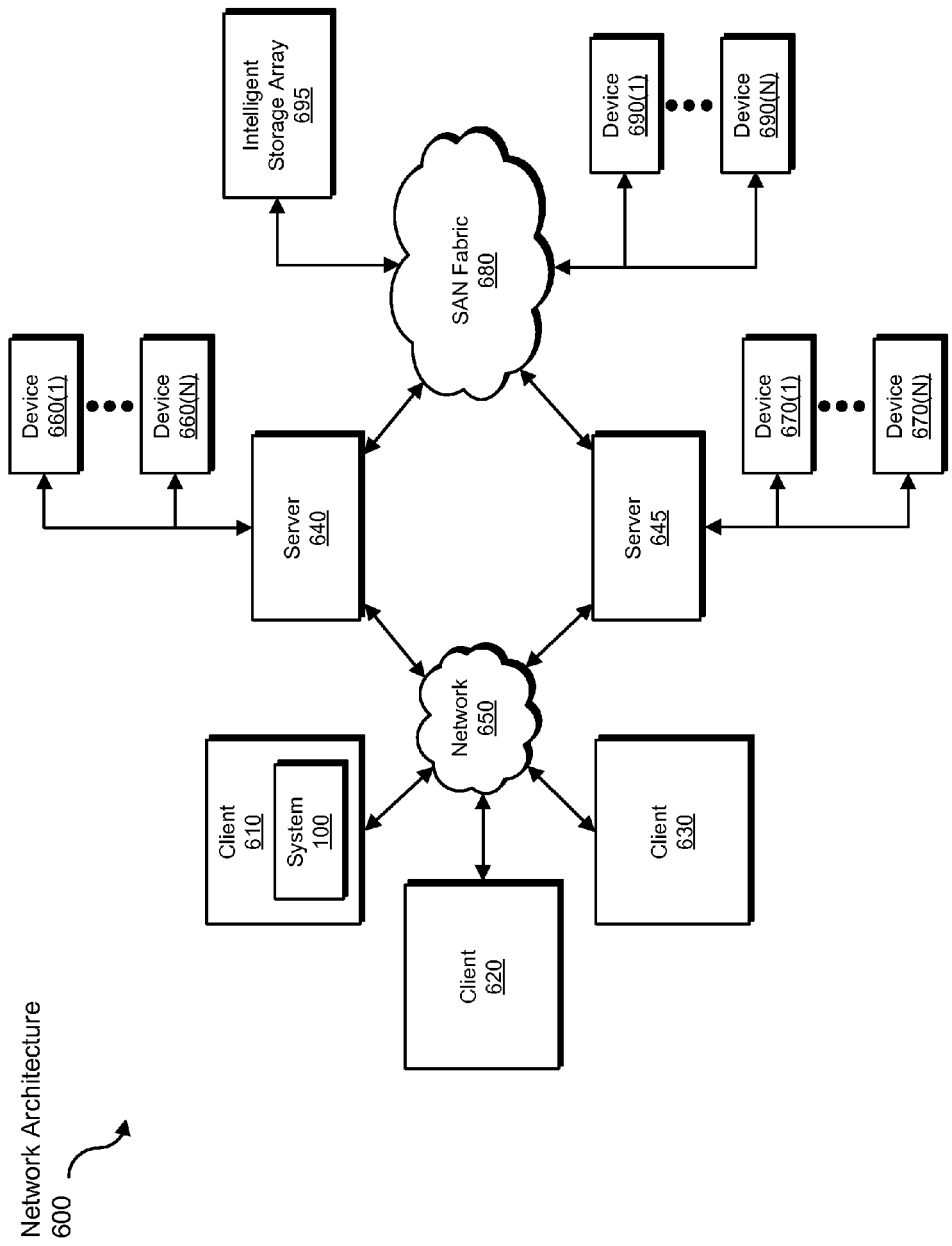
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. Client systems 610, 620, and 630 generally represent any type or form of computing device or system, such as exemplary computing system 510 in FIG. 5. In one example, client system 610 may include system 100 from FIG. 1.

Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650. Accordingly, network architecture 600 may perform and/or be a means for performing, either alone or in combination with other elements, one or more of the identifying, detecting, receiving, selecting, excluding, reconfiguring, and/or configuring steps disclosed herein. Network architecture 600 may also be used to perform and/or be a means for performing other steps and features set forth in the instant disclosure.

As detailed above, computing system 510 and/or one or more components of network architecture 600 may perform and/or be a means for performing, either alone or in combination with other elements, one or more steps of an exemplary method for performing input/output path failovers.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules described herein may transform a multipathing I/O system into a more efficient I/O path failover handling system.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing input/output path failovers, at least a portion of the method being performed by a computing device comprising at least one processor, the method comprising:

identifying a computing system that is connected to a storage array, wherein:

the storage array comprises a plurality of storage processors, and each storage processor in the plurality of storage processors is within a plurality of input/output paths that connect the computing system to the storage array, and the storage array is partitioned into a plurality of logical units;

detecting a failure of a first input/output path within the plurality of input/output paths used by the computing system to communicate with the storage array, wherein the first input/output path includes a first storage processor;

receiving a communication from the storage array indicating that the first storage processor within the first input/output path is unavailable;

for each logical unit in the plurality of logical units that uses an input/output path including the first storage processor:

identifying a candidate alternate input/output path that includes the first storage processor from a list of candidate alternate input/output paths;

excluding the candidate alternate input/output path that includes the first storage processor as a viable alternate path for a failover attempt based on:

the candidate alternate input/output path that includes the first storage processor, and the communication from the storage array indicating that the first storage processor within the first input/output path is unavailable;

selecting at least one alternate input/output path from the list of candidate alternate input/output paths that includes a second storage processor and does not include the first storage processor, and reconfiguring the computing system to access the storage array via the alternate input/output path that includes the second storage processor.

2. The computer-implemented method of claim 1, wherein the failure of the first input/output path comprises an operator-induced failure of the first storage processor.

3. The computer-implemented method of claim 2, wherein the operator-induced failure comprises a firmware update of the first storage processor.

4. The computer-implemented method of claim 1, wherein detecting the failure of the first input/output path comprises detecting an error originating from the first storage processor.

5. The computer-implemented method of claim 1, wherein reconfiguring the computing system comprises configuring a multipath driver running on the computing system to use the alternate input/output path for attempts to access the storage array.

6. The computer-implemented method of claim 1, wherein selecting the alternate input/output path from the list of candidate alternate input/output paths comprises excluding every candidate alternate input/output path from the list of candidate input/output paths that includes the first storage processor.

7. The computer-implemented method of claim 1, wherein:

the computing system comprises a cluster of nodes, and the cluster of nodes comprises a plurality of nodes;

the first input/output path is used by a first node in the cluster;

the alternative input/output path that includes the second storage processor enables each node in the cluster of nodes to access the storage array without use of the first storage processor.

8. The computer-implemented method of claim 7, further comprising providing, from the first node in the cluster of nodes, information about the failure of the first input/output path to each other node in the cluster of nodes, wherein the information about the failure of the first input/output path is sent from an instance of a selection module on the first node to instances of the selection module on each other node in the cluster of nodes.

9. The computer-implemented method of claim 7, wherein identifying the computing system comprises at least one of reading a configuration file that identifies each node in the cluster of nodes or receiving a message that identifies each node in the cluster of nodes.

10. A system for performing input/output path failovers, the system comprising:

a detection module programmed to:

identify a computing system that is connected to a storage array, wherein:

the storage array comprises a plurality of storage processors, and each storage processor in the plurality of storage processors is within a plurality of input/output paths that connect the computing system to the storage array, and the storage array is partitioned into a plurality of logical units;

detect a failure of a first input/output path within the plurality of input/output paths used by the computing system to communicate with the storage array, wherein the first input/output path includes a first storage processor;

a receiving module programmed to receive a communication from the storage array indicating that the first storage processor within the first input/output path is unavailable;

a selection module programmed to, for each logical unit in the plurality of logical units that uses an input/output path including the first storage processor:

identify a candidate alternate input/output path that includes the first storage processor from a list of candidate alternate input/output paths;

exclude the candidate alternate input/output path that includes the first storage processor as a viable alternate path for a failover attempt based on:

the candidate alternate input/output path that includes the first storage processor, and the communication from the storage array indicating that the first storage processor within the first input/output path is unavailable;

select at least one alternate input/output path from the list of candidate input/output paths that includes a second storage processor and does not include the first storage processor;

a reconfiguration module programmed to, for each logical unit in the plurality of logical units that uses the input/output path including the first storage processor, reconfigure the computing system to access the storage array via the alternate input/output path that includes the second storage processor;

at least one hardware processor configured to execute the detection module, the receiving module, the selection module, and the reconfiguration module.

11. The system of claim 10, wherein the failure of the first input/output path comprises an operator-induced failure of the first storage processor.

12. The system of claim 11, wherein the operator-induced failure comprises a firmware update of the first storage processor.

13. The system of claim 10, wherein the detection module is programmed to detect the failure of the first input/output path by detecting an error originating from the first storage processor.

14. The system of claim 10, wherein the reconfiguration module is programmed to reconfigure the computing system by configuring a multipath driver running on the computing system to use the alternate input/output path for attempts to access the storage array.

15. The system of claim 10, wherein the selection module is programmed to select the alternate input/output path from the list of candidate alternate input/output paths by excluding every candidate alternate input/output path from the list of candidate input/output paths that includes the first storage processor.

16. The system of claim 10, wherein:
the computing system comprises a cluster of nodes, and the cluster of nodes comprises a plurality of nodes;
the first input/output path is used by a first node in the cluster;
the alternative input/output path that includes the second storage processor allows each node in the cluster of nodes to access the storage array without use of the first storage processor.

17. The system of claim 16, wherein:
the selection module is programmed to provide, from the first node in the cluster of nodes, information about the failure of the first input/output path to each other node in the cluster of nodes;
the information about the failure of the first input/output path is sent from an instance of a selection module on the first node to instances of the selection module on each other node in the cluster of nodes.

18. The system of claim 16, wherein the detection module is programmed to identify the computing system by performing at least one of reading a configuration file that identifies each node in the cluster of nodes or receiving a message that identifies each node in the cluster of nodes.

19. A non-transitory computer-readable medium comprising one or more computer-executable instructions that, when executed by at least one hardware processor of a computing device, cause the computing device to:
identify a computing system that is connected to a storage array, wherein:
the storage array comprises a plurality of storage processors, and each storage processor in the plurality of storage processors is within a plurality of input/output paths that connect the computing system to the storage array, and
the storage array is partitioned into a plurality of logical units;
detect a failure of a first input/output path within the plurality of input/output paths used by the computing system to communicate with the storage array, wherein the first input/output path includes a first storage processor;
receive a communication from the storage array indicating that the first storage processor within the first input/output path is unavailable;
for each logical unit in the plurality of logical units that uses an input/output path including the first storage processor:
identify a candidate alternate input/output path that includes the first storage processor from a list of candidate alternate input/output paths;
exclude the candidate alternate input/output path that includes the first storage processor as a viable alternate path for a failover attempt based on:
the candidate alternate input/output path that includes the first storage processor, and
the communication from the storage array indicating that the first storage processor within the first input/output path is unavailable;
select at least one alternate input/output path from the list of candidate input/output paths that includes a second storage processor and does not include the first storage processor, and
reconfigure the computing system to access the storage array via the alternate input/output path that includes the second storage processor.

20. The computer-readable medium of claim 19, wherein the failure of the first input/output path comprises an operator-induced failure of the first storage processor.

\* \* \* \* \*